United States Patent [19]

Keijsper

[11] Patent Number: 5,210,178

[45] Date of Patent: May 11, 1993

[54] GAS PHASE POLYKETONE POLYMER PREPARATION WITH PRELIMINARY ADDITION OF WATER

[75] Inventor: Johannes J. Keijsper, Amsterdam, Netherlands

[73] Assignee: Shell Oil Company, Houston, Tex.

[21] Appl. No.: 901,288

[22] Filed: Jun. 19, 1992

[30] Foreign Application Priority Data

Jun. 27, 1991 [NL] Netherlands ............... 9101114

[51] Int. Cl.$^5$ .................................. C08G 67/02
[52] U.S. Cl. .................................. 528/392
[58] Field of Search ........................ 528/392

[56] References Cited

U.S. PATENT DOCUMENTS

| | | |
|---|---|---|
| 4,778,876 | 10/1988 | Doyle et al. . |
| 4,843,144 | 6/1989 | Van Broekhoven et al. . |
| 4,880,903 | 11/1989 | Van Broekhoven et al. . |
| 4,940,774 | 7/1990 | Wong . |

FOREIGN PATENT DOCUMENTS

| | | |
|---|---|---|
| 248483 | 12/1987 | European Pat. Off. . |
| 361623-A2 | 4/1990 | European Pat. Off. . |
| 443687-A2 | 8/1991 | European Pat. Off. . |
| 485039-A2 | 5/1992 | European Pat. Off. . |
| 485058-A2 | 5/1992 | European Pat. Off. . |
| 89-01311-A | 5/1989 | Netherlands . |

Primary Examiner—Harold D. Anderson

[57] ABSTRACT

Linear alternating polyketone polymers of carbon monoxide and one or more olefinically unsaturated compounds are prepared by contacting the monomers at elevated temperature and pressure with a catalyst suitable for this purpose, the polymer preparation being carried out as a gas phase polymerization and water being introduced into the polymerization reactor prior to the polymerization.

20 Claims, No Drawings

GAS PHASE POLYKETONE POLYMER PREPARATION WITH PRELIMINARY ADDITION OF WATER

FIELD OF THE INVENTION

The invention relates to a process for the preparation of polymers of carbon monoxide with one or more olefinically unsaturated compounds.

BACKGROUND OF THE INVENTION

Linear polymers of carbon monoxide and one or more olefinically unsaturated compounds in which monomer units from carbon monoxide and monomer units from the olefinically unsaturated compounds are present in an alternating arrangement can be prepared by contacting the monomers at elevated temperature and pressure with a catalyst suitable for this purpose. These polymers, generally known as polyketone polymers or polyketones, have repeating units of the formula

wherein A is a unit derived from at least one olefinically unsaturated hydrocarbon. U.S. Pat. No. 4,880,903 (Van Broekhoven et al.), for example, discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal, the anion of a strong acid, and a bidentate ligand of phosphorus, nitrogen, or sulfur. U.S. Pat. No. 4,843,144 (Van Broekhoven et al.), for example, incorporated herein by reference, discloses a process for preparing polymers of carbon monoxide and at least one ethylenically unsaturated hydrocarbon using a catalyst comprising a compound of palladium, the anion of a non-hydrohalogenic acid having a pKa of below about 6 and a bidentate ligand of phosphorus.

The preparation of polyketone polymers can be carried out in two ways which, depending on the continuous phase in which the polymerization takes place, are referred to as liquid phase polymerization and gas phase polymerization. In liquid phase polymerization, the continuous phase is formed by a liquid diluent in which the catalyst is soluble but the polymers formed are insoluble or virtually insoluble. At the end of the polymerization, the polymers are separated from the liquid phase and the pure diluent intended for a subsequent polymerization is recovered from the remaining liquid. In gas phase polymerization, the continuous phase is formed by gaseous carbon monoxide and optionally one or more of the other monomers, in so far as they are present in gaseous form in the reactor.

For the preparation of the polymers on a commercial scale, gas phase polymerization is preferred because the liquid phase separation step, as well as the purification step, can be omitted. U.S. Pat. No. 4,778,876 (Doyle et al.), for example, incorporated herein by reference, discloses a gas phase process for the production of polyketone polymers However, some catalysts can exhibit a lower activity in gas phase polymerization than in liquid phase polymerization.

It has been found that the activity of a gas phase polymerization catalyst can be considerably enhanced by introducing an alcohol into the polymerization reactor prior to the polymerization. To attain the desired activity enhancement, introduction of only a small quantity of alcohol is sufficient. The desired effect is also achieved with larger quantities of alcohol, the upper limit being set by the requirement that the continuous phase in which the polymerization takes place is formed by gaseous carbon monoxide and optionally one or more of the other monomers in so far as these are present in the reactor in gaseous form. A drawback of the use of alcohols in the above-mentioned polymerization is that at least a part of the alcohol employed can remain behind in the polymers thus prepared. In the course of continued research on the gas phase polymerization of polyketones, it has now surprisingly been found that the activity-enhancing effect on the catalyst that was previously observed when employing an alcohol is also obtained if water is introduced into the polymerization reactor prior to the polymerization.

SUMMARY OF THE INVENTION

The present invention provides a process for the preparation of linear alternating polyketone polymers of carbon monoxide and one or more olefinically unsaturated compounds, prepared by contacting the monomers at elevated temperature and pressure with a catalyst suitable for this purpose. More particularly, the invention provides a gas phase polymerization process wherein water is introduced into the polymerization reactor prior to the polymerization, to enhance catalyst activity. The invention further relates to the polymers thus prepared as well as to shaped objects consisting at least partly of these polymers.

DESCRIPTION OF THE INVENTION

In the gas phase polymerization according to the invention, a catalyst is used which possesses the capacity of catalyzing the formation of the previously mentioned linear alternating polyketone polymers. Suitable catalysts for the present purpose are those which contain a Group VIII metal (the noble metals ruthenium, rhodium, palladium, osmium, iridium and platinum, as well as the iron group metals iron, cobalt and nickel). Catalysts containing palladium, nickel or cobalt as the Group VIII metal are preferred, and palladium is particularly preferred as the Group VIII metal. The Group VIII metal is preferably incorporated in the form of a salt of a carboxylic acid, in particular in the form of an acetate.

In addition to a Group VIII metal, the catalysts preferably contain a bidentate ligand that can form a complex with the Group VIII metal. If a nitrogen bidentate ligand is used, compounds are preferred of the general formula

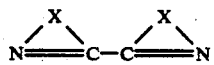

in which X represents an organic bridging group containing three or four atoms in the bridge, of which at least two are carbon atoms. Suitable compounds include 2,2,-bipyridine and 1,10-phenanthroline. If a sulfur bidentate ligand is used, a preferred compound is of the general formula $R_1S-R-SR_1$ in which $R_1$ represents an optionally polar substituted hydrocarbon group and R represents a divalent organic bridging group containing at least two carbon atoms in the bridge. Suitable compounds include 1,2-bis(ethylthio)ethane and cis-1,2-bis(benzylthio)ethene. The use of phosphorus bidentate ligands of the general formula $(R_1)_2P-R-P(R_1)_2$ is preferred, in which R and $R_1$ have the previously indicated meanings. There is further preference for the use of such phosphorus bidentate ligands in which $R_1$ represents an aromatic hydrocarbon group carrying at the ortho position relative to the phosphorus atom to which it is linked at least one alkoxy substituent. A very suitable compound for the present purpose is 1,3-bis[bis(2-methoxyphenyl)phosphino]propane. If in the catalysts use is made of a nitrogen or sulfur bidentate ligand, the quantity employed is from about 0.5 to about 100 moles and preferably from about 1 to about 50 moles per mole of Group VIII metal. If a phosphorus bidentate ligand is used, the quantity employed is from about 0.5 to about 2 moles and preferably from about 0.75 to about 1.5 moles per mole Group VIII metal.

Besides a Group VIII metal and a phosphorus, nitrogen or sulfur bidentate ligand, the catalysts preferably contain an acid component. As examples of suitable acid components, strong organic acids can be mentioned such as para-toluene sulphonic acid, trifluoroacetic acid and methylsulphonic acid. Very suitable acid components include acids with a pKa of at least 2, such as phosphoric acid, tartaric acid, citric acid and ascorbic acid; and Lewis acids of the general formula $MF_n$ where M represents an element that can form a Lewis acid with fluorine, where F represents fluorine and where n has the value 3 or 5, such as borium trifluoride, aluminum trifluoride, and antimony pentafluoride.

There is particular preference for Lewis acid/Brönsted acid mixtures as an acid component in the catalysts. Preferably, these mixtures contain from about 0.1 to about 10 moles and preferably from about 0.5 to about 5 moles Brönsted acid per mole Lewis acid. Very suitable Lewis acids for application in these mixtures are fluorides such as borium trifluoride, titanium tetrafluoride, phosphorus pentafluoride, and antimony pentafluoride. As a Brönsted acid, hydrofluoric acid is very suitable. Acid components of the present type are preferably selected from tetrafluoroboric acid, hexafluorotitanic acid, hexafluorophosphoric acid and hexafluoroantimonic acid.

The quantity of acid component in the catalysts is from about 0.5 to about 200 moles and preferably from about 1 to about 100 moles per mole Group VIII metal, with the proviso that if a Lewis acid/Brönsted acid mixture is used, these quantities refer to the Lewis acid present in the mixture.

To enhance the activity of the catalysts, an organic oxidizing agent can also be incorporated therein. Aromatic nitro compounds such as nitrobenzene are very suitable for this purpose. The quantity of organic oxidizing agent used is from about 5 to about 5000 moles and preferably from about 10 to about 1000 moles per mole Group VIII metal.

The desired catalyst activity enhancement is achieved both by the addition of a small quantity of water and by the addition of larger quantities of water. The quantity of water which according to the invention is introduced into the reactor prior to the polymerization is preferably at least about 1 mole and most preferably at least about 10 moles per mole Group VIII metal. The quantity of water added to the reactor may be, for example, from about 5,000 to about 50,000 moles of water per mole of Group VIII metal. The upper limit of the allowable quantity of water is set by the requirement that gas should form the continuous phase in the reactor. The introduction of water into the reactor prior to the polymerization can very suitably take place by introducing the water either separately or together with the catalyst, or with one or more of the monomers when charging the reactor.

In the gas phase polymerization of the invention, use is preferably made of a catalyst applied to a carrier. There is particular preference for carriers with a relative bulk density and average particle diameter such as to satisfy the relationship $$(d)^r < 30$$

where r represents the relative bulk density in gm/ml and d the average particle diameter in microns. The relative bulk density r of a carrier is understood to be the quotient of the bulk density of the carrier expressed in g/ml divided by 0.6 times the density of the carrier, also expressed in g/ml. There is preference for carriers with an r of from about 0.05 to about 1.0 gm/ml and most preferably for carriers with an r of from about 0.1 to about 0.9 g/ml. There is also preference for carriers with a d of from about 1 to about 2000 microns and most preferably from about 10 to about 1000 microns.

If in the gas phase polymerization of the invention use is made of a catalyst which is applied to a carrier, there is preference for catalysts which contain from about 10 to about 100,000 mg and most preferably from about 50 to about 10,000 mg Group VIII metal per kg carrier. The application of the catalyst to the carrier can take place by impregnating the carrier with a solution or suspension of the catalyst in a liquid diluent consisting at least partly of water, optionally followed by partial removal of the diluent, with water remaining behind in the catalyst. If the catalyst comprises a plurality of components, the catalyst preparation can take place either by applying all components together or by applying one or more of the components separately to the carrier by impregnation. As carrier, a porous carrier is preferably chosen.

As carriers for the catalysts, both inorganic and organic carriers are eligible. Examples of suitable carriers are silica, alumina, talc, charcoal, cellulose, dextrose and dextran gel. Polymers such as polyethylene, polypropylene and polystyrene can also be used as carriers. If the gas phase polymerization is carried out with the catalyst applied to a carrier, products are obtained in which the prepared polymer occurs together with the carrier used. Depending on the nature and quantity used of the carrier, products with a very wide range of properties and applications can be prepared. If desired, the carrier can be wholly or partly removed from the product at the end of the polymerization by treating the product either with a solvent in which the prepared polymer is soluble but the carrier is insoluble, or with a solvent in which the carrier is soluble but the prepared polymer is insoluble. A polymer whose structure and composition corresponds substantially to that of the polymer to be prepared is preferably used as carrier for the catalyst.

Olefinically unsaturated compounds which can be polymerized with carbon monoxide include compounds which consist exclusively of carbon and hydrogen, as well as compounds which besides carbon and hydrogen also contain one or more heteroatoms. The process according to the invention is preferably used for the preparation of polymers of carbon monoxide with one or more olefinically unsaturated hydrocarbons Examples of suitable hydrocarbon monomers are ethene, propene, butene-1, hexene-1, octene-1, styrene, cyclopentene, norbornene and dicyclopentadiene. The process according to the invention is in particular very suitable for use in the preparation of copolymers of carbon monoxide with ethene and in the preparation of terpolymers of carbon monoxide with ethene and an α-olefin, in particular propene.

The quantity of catalyst used in the process according to the invention can vary within wide limits. A quantity of catalyst is preferably used which contains from about $1\times10^7$ to about $1\times10^{-3}$ moles and in particular from about $1\times10^{-6}$ to about $1\times10^{-4}$ moles Group VIII metal per mole of total olefinically unsaturated compound to be polymerized.

The polymerization is preferably carried out at a temperature of from about 25° to about 150° C. and a pressure of from about 2 to about 150 bar, and most preferably at a temperature of from about 30° to about 130° C. and a pressure of from about 5 to about 100 bar. The molar ratio of the olefinically unsaturated compounds relative to carbon monoxide is preferably from about 10:1 to about 1:10 and most preferably from about 5:1 to about 1:5. The polymer preparation according to the invention can be carried out either batchwise or continuously.

The invention will now be illustrated with reference to the following Comparative Examples (not of the invention) and Illustrative Examples, which are not to be construed as limiting.

COMPARATIVE EXAMPLE 1

A carbon monoxide/ethene copolymer was prepared as follows. A catalyst composition was prepared by incorporating 8 g of a linear alternating carbon monoxide/ethene copolymer with a pore volume of 0.5 ml/g in a catalyst solution containing:

20 ml dry methyl ethyl ketone,
0.0095 mmol palladium acetate,
0.19 mmol citric acid, and
0.01 mmol 1,3-bis[bis(2-methoxyphenyl)phosphino]propane, evaporating the suspension thus obtained to dryness and drying the resulting catalyst composition for 2 hours at 50° C. under reduced pressure.

The catalyst composition thus prepared was introduced into a stirred autoclave. After the air in the autoclave have been displaced by nitrogen, the autoclave contents were brought to 85° C. and a 1:1 carbon monoxide/ethene mixture was forced in until a pressure of 50 bar was reached. During the polymerization the pressure was maintained by forcing in a 1:1 carbon monoxide/ethene mixture. After 4 hours the polymerization was terminated by cooling the reaction mixture to room temperature and releasing the pressure. 12.4 g copolymer was obtained. The polymerization rate was 1.1 kg copolymer/(g palladium-hour).

ILLUSTRATIVE EXAMPLE 1

A carbon monoxide/ethene copolymer was prepared in substantially the same way as in Comparative Example 1, but with the following differences:
 a) prior to the polymerization, 1 ml water was introduced into the reactor, and
 b) the reaction time was 3 hours instead of 4 hours.

21.8 g copolymer was obtained. The polymerization rate was 4.6 kg copolymer/(g palladium-hour).

ILLUSTRATIVE EXAMPLE 2

A carbon monoxide/ethene copolymer was prepared in substantially the same way as in Comparative Example 1, but with the following differences:
 a) prior to the polymerization, 7 ml water was introduced into the reactor, and
 b) the reaction time was 3 hours instead of 4 hours.

17.6 g copolymer was obtained. The polymerization rate was 3.2 kg copolymer/(g palladium-hour).

The favorable effect on the catalyst activity that occurs if, for gas phase polymerization, water is introduced into the reactor prior to the polymerization can be seen clearly by comparison of the results of Illustrative Examples 1 and 2 with the result of Comparative Example 1. A considerable increase in the polymerization rate is observed both if a small quantity of water (1 ml) and a larger quantity of water (7 ml) is used. It was established by NMR analysis that the carbon monoxide/ethene copolymers prepared according to examples 1-3 were built up of linear chains in which the units from carbon monoxide and the units from ethene were present in an alternating arrangement.

I claim:

1. In the process of producing a linear alternating polymer of carbon monoxide and at least one olefinically unsaturated hydrocarbon by contacting the carbon monoxide and hydrocarbon in a reactor under gas phase polymerization conditions and in the presence of a catalyst composition formed from a salt of a Group VIII metal, an acid component having a pKa of at least 2, and a bidentate ligand of phosphorus, nitrogen, or sulfur, the improvement wherein water is added to the reactor prior to commencement of polymerization in an amount of at least about one mole of water per mole of Group VIII metal.

2. The process of claim 1 wherein the amount of water added to the reactor is at least about 10 moles per mole of Group VIII metal.

3. The process of claim 1 wherein the amount of water added to the reactor is from about 5000 moles to about 50,000 moles per mole of Group VIII metal.

4. The process of claim 2 wherein the Group VIII metal is palladium.

5. The process of claim 2 wherein the salt of a Group VIII metal is a carboxylic acid salt.

6. The process of claim 2 wherein the bidentate ligand is a phosphorus ligand.

7. The process of claim 2 wherein the acid component is selected from the group consisting of phosphoric acid, tartaric acid, citric acid, and ascorbic acid.

8. The process of claim 2 wherein the acid component is a Lewis acid/Brönsted acid mixture.

9. In the process of producing a linear alternating polymer of carbon monoxide and at least one α-olefin by contacting the carbon monoxide and α-olefin in a reactor under gas phase polymerization conditions and in the presence of a catalyst composition formed from a palladium salt, an acid component having a pKa of at least 2, and a bidentate phosphorus ligand, the improvement wherein water is added to the reactor prior to commencement of polymerization in an amount of at least about one mole of water per mole of palladium.

10. The process of claim 9 wherein the amount of water added to the reactor is at least about 10 moles per mole of Group VIII metal.

11. The process of claim 9 wherein the amount of water added to the reactor is from about 5000 moles to about 50,000 moles per mole of Group VIII metal.

12. The process of claim 9 wherein the palladium salt is a carboxylic acid salt.

13. The process of claim 9 wherein the acid component is selected from the group consisting of phosphoric acid, tartaric acid, citric acid, and ascorbic acid.

14. The process of claim 9 wherein the acid component is a Lewis acid/Brönsted acid mixture.

15. In the process of producing a linear alternating polymer of carbon monoxide and ethene, with or without propene, by contacting the carbon monoxide and hydrocarbon in a reactor under gas phase polymerization conditions and in the presence of a catalyst composition formed from a palladium salt, an acid component having a pKa of at least 2, and a bidentate phosphorus ligand, the improvement wherein water is added to the reactor prior to commencement of polymerization in an amount of at least about one mole of water per mole of palladium.

16. The process of claim 15 wherein the amount of water added to the reactor is at least about 10 moles per mole of Group VIII metal.

17. The process of claim 15 wherein the amount of water added to the reactor is from about 5000 moles to about 50,000 moles per mole of Group VIII metal.

18. The process of claim 15 wherein the palladium salt is a carboxylic acid salt.

19. The process of claim 15 wherein the acid component is selected from the group consisting of phosphoric acid, tartaric acid, citric acid, and ascorbic acid.

20. The process of claim 15 wherein the acid component is a Lewis acid/Brönsted acid mixture.

* * * * *